United States Patent Office 3,143,579
Patented Aug. 4, 1964

3,143,579
ISOMERIZATION PROCESS
Boyd N. Hill and David G. Walter, Baytown, Tex., assignors, by mesne assignments, to Esso Research and Engineering Company, Elizabeth, N.J., a corporation of Delaware
No Drawing. Filed July 12, 1961, Ser. No. 123,439
4 Claims. (Cl. 260—683.76)

The present invention relates to converting hydrocarbons to isomers thereof and particularly to converting paraffinic hydrocarbons to isoparaffins employing an aluminum halide-phosphoric acid complex catalyst in which formation of a sticky, gummy catalyst is prevented by the addition of phosphorus oxychloride or trifluoroacetic acid.

An improved specific isomerization process for converting straight chain paraffinic hydrocarbons, especially the lower members of the series such as normal butane, normal pentane, normal hexane, normal heptane, etc., to corresponding isoparaffins such as isobutane, isopentane, isohexane, isoheptane, etc., which utilizes an aluminum halide catalyst system with phosphoric acid as a promoter or cocatalyst, is disclosed and claimed in U.S. patent application Ser. No. 781,125, filed December 17, 1958, by Walker et al., entitled "Hydrocarbon Conversion," and now abandoned; and application Ser. No. 781,126, filed December 17, 1958, by Walker et al., entitled "Isomerization Process," and now abandoned. In these applications the catalyst system comprises a reacted aluminum halide and a free aluminum halide in which the reacted aluminum halide comprises the combination of an aluminum halide and phosphoric acid. The phosphoric acid and aluminum halides (aluminum bromide or aluminum chloride or mixtures thereof) are preferably employed in relative amounts in the catalyst phase such that the mol ratio of phosphoric acid to aluminum halide is in the range from about 0.30 to 0.65 with an optimum ratio of about 0.45:1. In application Ser. No. 781,125 the effectiveness of the specific isomerization without aromatics in the feed is shown. It is known that benzene and other aromatics, even in small concentrations of about 0.1 vol. percent, inhibit seriously the activity of promoted aluminum halide catalysts for the specific isomerization of normal paraffins. In application Ser. No. 781,126 the effectiveness of the specific isomerization in the presence of aromatics is shown. In the latter case data are provided showing that phosphoric acid resists the inhibitory effect of the aromatics to the isomerization conversion process while the aromatics remain substantially unaltered.

The phosphoric acid-aluminum halide catalyst system described in the applications mentioned supra has the disadvantage of forming a sticky, gummy complex, which interferes with the efficiency of contacting the catalyst phase with the hydrocarbons and therefore presents problems in commercial application of this process. The present invention overcomes these difficulties by adding a solutizer or melting point depressor such as phosphorus oxychloride ($POCl_3$) or trifluoroacetic acid ($CF_3COOH$), which reduces the melting point of the phosphoric acid-aluminum halide complex to form a fluid catalyst phase which achieves more efficient contacting of the catalyst with the hydrocarbon.

A series of experiments, the results of which are shown in Tables I and II, were performed to demonstrate the use of the solutizers in the isomerization process. In these experiments aluminum bromide was added to a normal paraffin (normal hexane and normal heptane) feed contained in a reaction vessel. After a brief stirring, phosphoric acid was added slowly with stirring, and phosphorus oxychloride or trifluoroacetic acid was added to provide a very fluid phosphoric acid-aluminum bromide complex. At the end of the reaction period, the hydrocarbon layer was separated from the catalyst phase, water washed several times, and analyzed by gas chromatography.

TABLE I

Effect of $POCl_3$ as a Solutizer on $H_3PO_4$-$AlBr_3$ Complex for the Isomerization of n-Hexane and n-Heptane Feeds Containing Benzene

| Feed | n-Hexane | | n-Heptane | | |
|---|---|---|---|---|---|
| Run No | 1 | 2 | 3 | 4 | 5 |
| Feed: | | | | | |
| Vol. percent n-paraffin | 84.8 | 84.8 | 87.0 | 87.0 | 87.0 |
| Vol. percent $C_6H_6$ | 6.5 | 6.5 | 13.0 | 13.0 | 13.0 |
| Mols/mol of n-paraffin: | | | | | |
| (1) $AlBr_3$ | 0.83 | 0.83 | 0.93 | 0.93 | 0.93 |
| (2) $H_3PO_4$ | 0.27 | 0.27 | 0.30 | 0.30 | 0.30 |
| (3) $POCl_3$ | | 0.067 | | 0.074 | 0.074 |
| Mols $AlBr_3$/mol of $H_3PO_4$ | 3.01 | 3.01 | 3.04 | 3.04 | 3.04 |
| Mols of $H_3PO_4$/mol of $POCl_3$ | | 4.1 | | 4.1 | 4.1 |
| Reaction, temp., °F | 110–115 | 110–115 | 110–115 | 110–115 | 78 |
| Reaction time, hrs | 3 | 3 | 3 | 3 | 3 |
| Prod. analysis, vol. percent: | | | | | |
| $C_5$ and lighter | 0.1 | 0.0 | 1.0 | 0.0 | 0.5 |
| 2.2 DMB | 35.0 | 33.8 | 0.1 | 0.5 | 0.0 |
| Other 1-$C_6$'s | 41.2 | 42.0 | 0.6 | 0.7 | 0.1 |
| Total 1-$C_6$'s | 76.2 | 75.8 | 0.7 | 1.2 | 0.1 |
| n-$C_6$ | 6.5 | 6.3 | 0.6 | 0.0 | 0.2 |
| MCP | 2.0 | 2.3 | 0.0 | 0.0 | 0.0 |
| $C_yC_6$ | 14.5 | 14.8 | 0.0 | 0.0 | 0.0 |
| Total 1-$C_7$'s | 0.0 | 0.0 | 84.7 | 85.9 | 80.8 |
| n-$C_7$ | 0.0 | 0.0 | 8.2 | 10.0 | 14.6 |
| Unknown | 0.0 | 0.0 | 2.1 | 0.0 | 0.0 |
| $C_6H_6$ | 0.7 | 0.8 | 2.7 | 2.9 | 3.8 |
| $knC_6$, $knC_7$, hr.$^{-1}$ | 1.07 | 1.11 | 1.17 | 1.11 | 0.81 |
| n-Paraffin conv., vol. percent | 92.3 | 92.6 | 90.6 | 88.5 | 83.2 |
| Physical state of catalyst | (1) | (2) | (3) | (4) | (4) |

[1] Very viscous black liquid.
[2] Liquid.
[3] Black viscous liquid.
[4] Very fluid liquid.

TABLE II

Effect of $CF_3COOH$ as a Solutizer on $H_3PO_4$-$AlBr_3$ Complex for the Isomerization of n-Hexane and n-Heptane Feed Containing Benzene

| Feed | n-Hexane | | | n-Heptane | |
|---|---|---|---|---|---|
| Run No | 1 | 2 | 3 | 4 | 5 |
| Feed: | | | | | |
| Vol. percent n-paraffin | 84.8 | 84.8 | 84.8 | 87.0 | 87.0 |
| Vol. percent $C_6H_6$ | 6.5 | 6.5 | 6.5 | 13.0 | 13.0 |
| Mols/mol of n-paraffin: | | | | | |
| (1) $AlBr_3$ | 0.83 | 0.83 | 0.83 | 0.93 | 0.93 |
| (2) $H_3PO_4$ (100 wt. percent) | 0.27 | 0.27 | 0.27 | 0.30 | 0.30 |
| (3) $CF_3COOH$ | | 0.067 | 0.134 | | 0.074 |
| Mols $AlBr_3$/Mol $H_3PO_4$ | 3.01 | 3.01 | 6.02 | | 3.04 |
| Mols of $H_3PO_4$/Mol of $CF_3COOH$ | | 4.1 | 1.0 | | 4.1 |
| Reaction temp., °F | 110–115 | 110–115 | 110–115 | 110–115 | 110–115 |
| Reaction time, hrs | 3 | 3 | 3 | 3 | 3 |
| Prod. analysis, vol. percent: | | | | | |
| $C_5$ and lighter | 0.1 | 0.0 | 0.0 | 1.0 | 0.6 |
| 2.2 DMB | 35.0 | 33.6 | 4.3 | 0.1 | 0.0 |
| Other 1-$C_6$'s | 41.2 | 46.7 | 34.3 | 0.6 | 0.1 |
| Total 1-$C_6$'s | 76.2 | 80.3 | 38.6 | 0.7 | 0.1 |
| n-$C_6$ | 6.5 | 6.8 | 42.3 | 0.6 | 0.0 |
| MEP | 2.0 | 2.1 | 1.7 | 0.0 | 0.0 |
| $C_yC_6$ | 14.5 | 14.9 | 12.9 | 0.0 | 0.0 |
| Total 1-$C_7$'s | 0.0 | 0.0 | 0.0 | 84.7 | 88.2 |
| n-$C_7$ | 0.0 | 0.0 | 0.0 | 8.2 | 8.3 |
| Unknown | 0.0 | 0.0 | 0.0 | 2.1 | 0.0 |
| $C_6H_6$ | 0.7 | 0.9 | 4.5 | 2.7 | 2.8 |
| $knC_6$, $knC_7$, hr.$^{-1}$ | 1.07 | 1.08 | 0.23 | 1.17 | 1.35 |
| n-Paraffin conv., vol. percent | 92.3 | 92.0 | 50.1 | 90.6 | 90.5 |
| Physical state of catalyst | (1) | (2) | (3) | (4) | (5) |

[1] Very viscous black liquid.
[2] Liquid.
[3] Miscible with HC.
[4] Black viscous liquid.
[5] Very fluid dark brown.

The data of the preceding tables show that good specific isomerization was obtained in these experiments.

Having fully described the objects and method of the invention, we claim:

1. An improved hydrocarbon conversion process comprising:
   contacting in a reactor a straight chain paraffinic hydrocarbon feed stock with as a sole added catalyst phosphoric acid and an aluminum halide selected from the group consisting of aluminum bromide and aluminum chloride under isomerization conditions in the presence of a solutizer selected from the group consisting of phosphorous oxychloride and trifluoroacetic acid.

2. A process as recited in claim 1 in which the solutizer is phosphorous oxychloride.

3. A process as recited in claim 1 in which the solutizer is trifluoroacetic acid.

4. A process as recited in claim 1 in which the mol ratio of phosphoric acid to aluminum halide is in the range from 0.3 to 0.65.

References Cited in the file of this patent

UNITED STATES PATENTS

| | | |
|---|---|---|
| 2,358,011 | Ipatieff et al. | Sept. 12, 1944 |
| 2,646,452 | Schmerling | July 21, 1953 |